(12) United States Patent
Schmid et al.

(10) Patent No.: US 9,187,660 B2
(45) Date of Patent: Nov. 17, 2015

(54) PREVENTION OF OPTICAL DENSITY LOSS IN INKJET PRINTING

(75) Inventors: Christian Schmid, Rancho Bernardo, CA (US); George M. Sarkisian, San Diego, CA (US); Grant A. Webster, Valley Center, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2679 days.

(21) Appl. No.: 11/129,456

(22) Filed: May 12, 2005

(65) Prior Publication Data
US 2006/0258773 A1    Nov. 16, 2006

(51) Int. Cl.
| | | |
|---|---|---|
| *B05D 1/32* | (2006.01) | |
| *B05D 1/36* | (2006.01) | |
| *B05D 5/00* | (2006.01) | |
| *B41J 2/01* | (2006.01) | |
| *B41J 2/17* | (2006.01) | |
| *C08G 18/08* | (2006.01) | |
| *C08G 73/10* | (2006.01) | |
| *C08K 5/04* | (2006.01) | |
| *C08K 5/06* | (2006.01) | |
| *C08K 5/09* | (2006.01) | |
| *C08L 75/00* | (2006.01) | |
| *C09D 5/00* | (2006.01) | |
| *C09D 11/00* | (2014.01) | |
| *G01D 11/00* | (2006.01) | |
| *C09D 11/30* | (2014.01) | |
| *C09D 11/54* | (2014.01) | |

(52) U.S. Cl.
CPC *C09D 11/30* (2013.01); *B05D 1/36* (2013.01); *B41J 2/01* (2013.01); *B41J 2/17* (2013.01); *C09D 11/54* (2013.01)

(58) Field of Classification Search
CPC .................................. C09D 11/30; C09D 11/54
USPC .................. 347/1, 84, 95, 100; 523/160, 161; 524/366, 376, 394, 543, 591, 839, 840; 427/256, 258, 466
See application file for complete search history.

(56) References Cited

U.S. PATENT DOCUMENTS

| | | | |
|---|---|---|---|
| 4,567,213 A | 1/1986 | Bhatia et al. | |
| 5,098,478 A | 3/1992 | Krishnan et al. | |
| 5,108,503 A * | 4/1992 | Hindagolla et al. | 106/31.47 |
| 5,693,129 A * | 12/1997 | Lin | 106/31.43 |
| 6,087,416 A | 7/2000 | Pearlstine et al. | |
| 6,417,248 B1 | 7/2002 | Gore | |
| 6,432,194 B2 | 8/2002 | Johnson et al. | |
| 6,632,858 B1 | 10/2003 | Pears et al. | |
| 7,744,205 B2 * | 6/2010 | Sarkisian et al. | 347/100 |
| 2004/0024083 A1 * | 2/2004 | Lee | 523/160 |
| 2006/0084721 A1 * | 4/2006 | Sarkisian et al. | 523/160 |

FOREIGN PATENT DOCUMENTS

| | | |
|---|---|---|
| EP | 1 388 576 A | 2/2004 |
| EP | 1 486 541 A1 | 12/2004 |
| EP | 1486541 * | 12/2004 |
| EP | 1 650 272 A | 4/2006 |

OTHER PUBLICATIONS www.cvimellesgriot.com, Author Unknown, Filters and Etalons, "Neutral-Density Filters", reference supplied by Appellant during prosecution, Date Unknown.*

* cited by examiner

*Primary Examiner* — Patrick Niland
(74) *Attorney, Agent, or Firm* — Hewlett-Packard Patent Department

(57) ABSTRACT

The present invention relates to an inkjet ink comprising: a) colorant; b) a polymeric binder having an acid number below 200 selected from the group consisting of a styrene-acrylic polymeric binder, an acrylic polymeric binder, an anionic polyurethane binder and combinations thereof; c) water dispersible surfactant; and d) a solvent which does not dissolve an acidified form of the binder, the solvent having a vapor pressure less than 0.1 mm at 25° C. The invention further relates to methods of making using the ink, printing systems and ink sets which use this ink.

39 Claims, 1 Drawing Sheet

PREVENTION OF OPTICAL DENSITY LOSS IN INKJET PRINTING

FIELD OF THE INVENTION

The present invention relates to ink binders which reduce optical density loss, especially with inkjet printed images printed under heated conditions.

BACKGROUND OF THE INVENTION

Ink-jet inks have traditionally exhibited lack of durability, especially in terms of durability to resist highlighter smear and finger smudge. Even today, many ink-jet printed products do not produce highly durable output, especially immediately after documents emerge from the printer.

SUMMARY OF THE INVENTION

The present invention relates to a method of printing which reduces optical density loss in a printed image comprising: printing the image on media with an ink comprising: a) colorant; b) a polymeric binder having an acid number below 200 selected from the group consisting of a styrene-acrylic polymeric binder, an acrylic polymeric binder, an anionic polyurethane binder and combinations thereof; and d) a solvent which does not dissolve an acidified form of the styrene-acrylic polymeric binder or acrylic polymeric binder, the solvent having a vapor pressure less than 0.1 mm at 25° C.

In addition, the present invention relates to an inkjet ink comprising: a) colorant; b) a polymeric binder having an acid number below 200 selected from the group consisting of a styrene-acrylic polymeric binder, an acrylic polymeric binder, an anionic polyurethane binder and combinations thereof; c) water dispersible surfactant; and d) a solvent which does not dissolve an acidified form of the styrene-acrylic polymeric binder or acrylic polymeric binder, the solvent having a vapor pressure less than 0.1 mm at 25° C.

Also, the present invention relates to a method of using an ink in combination with an acidic fixer fluid in a heated printing system to prevent reduced optical density in printed images, comprising: printing an image on media with the ink, the ink comprising: a) colorant; b) a polymeric binder having an acid number below 200 selected from the group consisting of a styrene-acrylic polymeric binder, an acrylic polymeric binder, an anionic polyurethane binder and combinations thereof; and d) a solvent which does not dissolve an acidified form of the styrene-acrylic polymeric binder or acrylic polymeric binder, the solvent having a vapor pressure less than 0.1 mm at 25° C.

Furthermore, the present invention relates to a printing system for heat-printing an ink in combination with an acidic fixer fluid, the printing system reducing optical density loss in printed images, the ink comprising: a) colorant; b) a polymeric binder having an acid number (defined as mg KOH neutralized by 1 g of a substance) below 200 selected from the group consisting of a styrene-acrylic polymeric binder, an acrylic polymeric binder, an anionic polyurethane binder and combinations thereof; and d) a solvent which does not dissolve an acidified form of the styrene-acrylic polymeric binder or acrylic polymeric binder, the solvent having a vapor pressure less than 0.1 mm at 25° C.

Additionally, the present invention relates to an ink-jet ink set comprising a black ink, wherein the black ink comprises: a) colorant; b) a polymeric binder having an acid number below 200 selected from the group consisting of a styrene-acrylic polymeric binder, an acrylic polymeric binder, an anionic polyurethane binder and combinations thereof; c) water dispersible surfactant; and d) a solvent which does not dissolve an acidified form of the styrene-acrylic polymeric binder or acrylic polymeric binder, the solvent having a vapor pressure less than 0.1 mm at 25° C.

DETAILED DESCRIPTION OF EMBODIMENTS OF THE INVENTION

Figure 1:
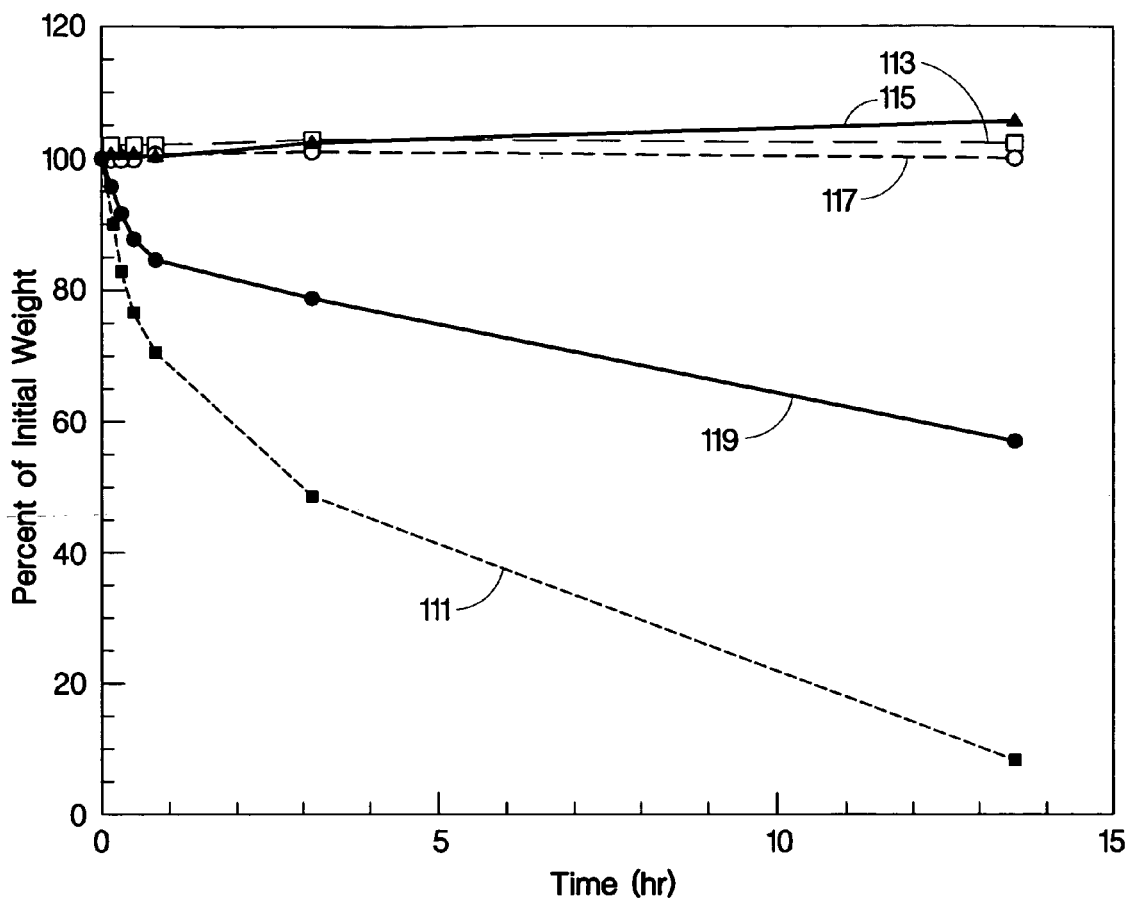
FIG. 1 is a graph representing an embodiment of the present invention, the graph showing the % weight of Joncryl 586 solids soaked in various 2P/water mixtures vs. time.

The present invention relates to an ink system as described above which delivers high optical density under hot/dry printing conditions, as well as decreased highlighter smear.

In water-based ink-jet ink, hydrophobic polymers such as styrene acrylic binders can be used to help produce such durability characteristics as waterfastness, smudge-resistance, low highlighter smear, better pigment dispersions, and/or better film forming qualities in inkjet ink printed images on a variety of substrates.

Furthermore in inkjet printing with inks comprising such hydrophobic polymers, heated conditions are sometimes used to rapidly dry the inkjet printed images, especially with black ink, and thereby make them more durable. This printing method can increase the printer throughput of the printed material but has the disadvantage of producing optical density loss in the images printed. Therefore, inks with a pigment/binder system, when they are printed under forced heating conditions to expedite drying, often show a significant decrease in optical density. To alleviate this problem, an ink solvent/surfactant system is described in the present invention which achieves high optical density, even under heated conditions.

For example, the optical density of black ink printed on media is affected by moisture in the media as well as by the application of heat to the media through the printer. For moist paper, applying heat to the printer drum leads to a slight increase in black optical density (KOD). This increase probably arises from faster ink evaporation and better sticking of colorant on the paper surface. In contrast, when paper is pre-dried, heated printing causes a severe KOD decrease.

Analysis of prints has shown that individual dot shapes change little with increase or decrease of humidity and/or print heat. Therefore it can be deduced that diminished covering power is not the main cause of KOD loss. Furthermore, ink strikethrough on the media is not significantly affected by changes in humidity and/or print heat. Therefore excessive colorant penetration is not responsible for decreased KOD in any significant way.

It has been observed that individual fibers in low-KOD plots appear glossy, while fibers in high-KOD prints have a dark, charcoal-black appearance. Furthermore, SEM micrographs of fiber surfaces show increased uniformity of pigment topography on low KOD prints.

It is hypothesized that increased specular reflection or gloss from fiber surfaces leads to low KOD. As evidence, it has been shown that this gloss is visible only under front-lighting conditions. Back-lighting causes such visible gloss to completely disappear.

The present application provides an explanation why the glossy finish develops on fiber surfaces. It also relates to ways to formulate both ink and fixer so that KOD loss does not occur.

Leading up to the present invention, ink-jet inks containing water solubilized styrene-acrylic, acrylic and/or polyurethane polymeric binders with low acid number, less than 200, have been shown to give superior durability and smudge resistance, especially when printed onto media where an acidic environment exists (e.g. printed in combination with an acidic fixer fluid) and especially when ink is dried rapidly under hot dry conditions.

A typical styrene-acrylic copolymer of acrylic acid and styrene is Joncryl 586, a random copolymer with a molecular weight measured at approximately 3800 g/mol. A typical polyurethane (PU) copolymer is a copolymer of isophorone, diisocyanate, dimethylolpropionic acid, and polypropylene glycol. The PU copolymer has a somewhat block-like structure with a number-averaged, molecular weight of approximately 4200 g/mol.

In a further embodiment of the present invention, the solvent in the ink must have a vapor pressure less than 0.1 mm at 25° C. and the solvent must appreciably dissolve the acidified form of the binder polymer, especially in the absence of water. In a preferred embodiment, the colorant is selected from the group consisting of self-dispersed pigment, dispersible pigment, dye, and combinations thereof. In another preferred embodiment, the colorant is either black or color. In yet another preferred embodiment the polymeric binder has a molecular weight of less than 20,000. In still another preferred embodiment, the solvent has a vapor pressure less than $10^{-2}$ mm at 25° C. In yet another preferred embodiment, such solvents may include: 1-(2-hydroxyethyl)-2-imidazolidinone (2HE2I), Tripropylene Glycol (3PG), Triethylene Glycol (3EG), Tetraethylene Glycol (4EG), 2-hydroxyethyl-2-pyrrolidone (2HE2P), 1,3-Bis(2-hydroxyethyl)-5,5-dimethylhydantoin (Dantocol DHE), 1,4-Pentanediol, 1,5-Pentanediol, 1,2,3-Hexanetriol, 1,2,6-Hexanetriol, 2-Ethyl-2-Hydroxy-Methyl-1,3-Propanediol (EHPD) and glycerol. Such a non-volatility requirement for the solvent would exclude the use of typical ink-jet solvents such as 1,2-hexanediol (1,2HD) or 2-pyrrolidone (2P).

In a further embodiment, the styrene-acrylic polymeric binder comprises a copolymer which includes acrylic acid and styrene. In another further embodiment, the acrylic polymeric binder comprises a copolymer comprised of acrylic acid and methacrylic acid. In yet another further embodiment, the anionic polyurethane binder comprises a copolymer which includes diisocyanate, dimethylol propionic acid and polypropylene glycol.

According to the present invention, a combination of durable styrene acrylic binders, acrylic binder and/or polyurethane binders, with acid number below 200, in combination with a heated printing apparatus can produce an output from a heated printer which is both highly durable and maintains good KOD. This is in contrast to earlier printouts from ink systems using binders which were printed under heated conditions to dry the print. In these earlier printouts, the image had significant optical density loss.

EXAMPLES

Example 1

The presence of Joncryl 586 binder (a styrene acrylic polymeric binder) in an ink has been shown to track with both glossy fibers and KOD loss. KOD readings were taken on a testbed that can simulate various humidity and temperature conditions for drying ink-jet printed ink and fixer on media. The readings were taken on prints generated by the printer with ~40° C. printer drum temperature. Black inks were tested on two varieties of plain uncoated paper (Hammermill Colorcopy (HMCC) and HP Multi Purpose (HPMP)). The inks contained black pigment, Joncryl-586, PU#3 (an Anionic Polyurethane Binder resin), a combination of 1,2HD, 2P and DPG as solvents, Zonyl FSO as a water-dispersible surfactant and Proxel GXL as a biocide. Tables 1A and 1B give the results for HMCC media and HPMP media respectively.

The KOD results shown are at both room moisture and dried media and at various concentrations of Joncryl 586 and PU#3.

TABLE 1A

HMCC media

| Ink | J586 | PU#3 | KOD, room moisture | KOD, dried media | ΔKOD |
|---|---|---|---|---|---|
| 1 | 1.0 | 0.8 | 1.35 | 1.35 | 0 |
| 2 | 1.4 | 0.4 | 1.42 | 1.39 | −0.03 |
| 3 | 1.8 | 0 | 1.51 | 1.41 | −0.10 |
| 4 | 1.0 | 1.6 | 1.34 | 1.32 | −0.02 |
| 5 | 1.8 | 0.8 | 1.28 | 1.25 | −0.03 |
| 6 | 1.0 | 1.6 | 1.31 | 1.31 | 0 |

TABLE 1B

HPMP media

| Ink | J586 | PU#3 | KOD, room moisture | KOD, dried media | ΔKOD |
|---|---|---|---|---|---|
| 1 | 1.0 | 0.8 | 1.34 | 1.33 | −0.01 |
| 2 | 1.4 | 0.4 | 1.43 | 1.37 | −0.06 |
| 3 | 1.8 | 0 | 1.50 | 1.43 | −0.07 |
| 4 | 1.0 | 1.6 | 1.29 | 1.29 | 0 |
| 5 | 1.8 | 0.8 | 1.32 | 1.26 | −0.06 |
| 6 | 1.0 | 1.6 | 1.30 | 1.29 | −0.01 |

Example 2

To probe this effect of Joncryl 586 on KOD in an ink, ~0.2 g of Joncryl 586 solids (in its acidified form, maybe denote as 'J586-H') were dissolved in 1 g quantities of various water/2P mixtures. It was found that there was a significant increase in J586 solubility as water was removed from the 2P. An 80% 2P/20% water solution weakly swells Joncryl 586 (6% weight gain in 13 hours), where a 100% 2P solvent readily dissolves Joncryl 586 (92% weight loss in 13 hours). FIG. 1 shows the weight gain/loss of Joncryl 586 solids soaked in various 2P/water mixtures, including: 100% water/0% 2P (line 117, open circles), 50% 2P (line 113, open squares), 80% 2P (line 115, filled triangles), 90% 2P (line 119, filled circles) and 100% 2P (line 111, filled squares). As set out in FIG. 1, the solubility of Joncryl 586 (J586-H) increases greatly (with subsequent decrease in KOD) as the water concentration decreases.

Example 3

Figure 2:
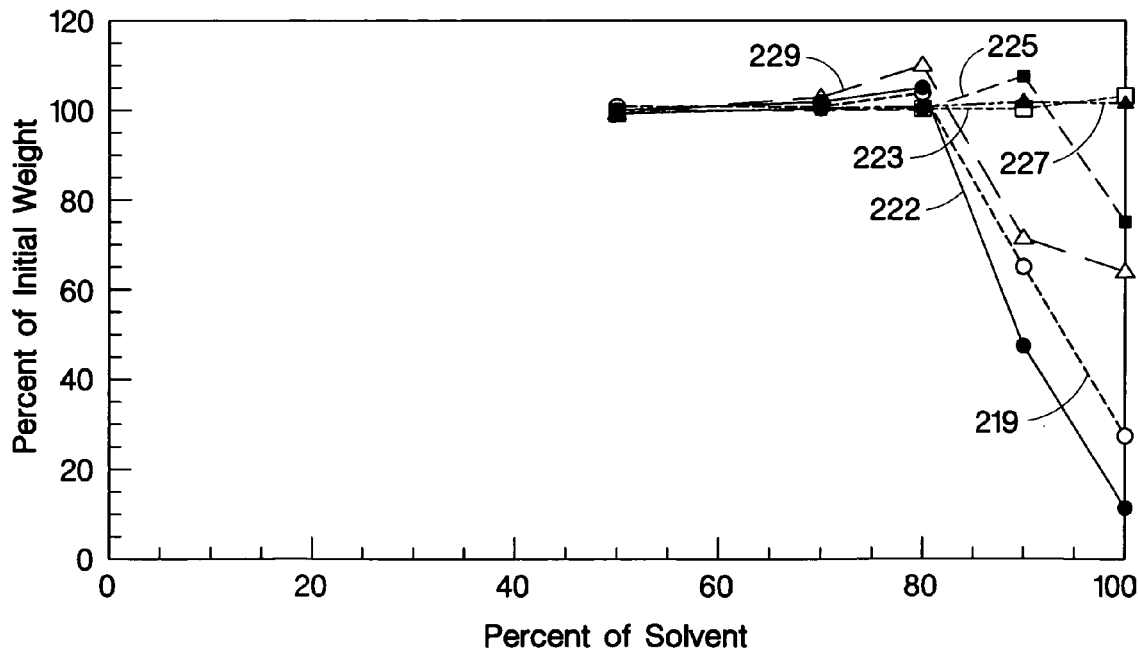
FIG. 2 is a graph representing an embodiment of the present invention, the graph showing the % weight of Joncryl 586 vs. the % of solvent remaining in the ink.

Joncryl 586 dissolution was tested in each of a set of typical ink-jet solvents and the results were compared in FIG. 2. In this test, pieces (~0.2 g) of Joncryl 586 in the acidified form (J586-H) were soaked in aqueous solvent solutions for six different co-solvents: 2-pyrrolidone (2P) (line 222, filled circles); 1,2-hexanediol (1,2HD) (line 229, open triangles); glycerol (line 223, open squares); tetraethylene glycol (4EG) (line 225, filled squares); 1-(2-hydroxyethyl)-2-imidazolidinone (2HE2I) (line 227, filled triangles); and tripropylene glycol (3PG) (line 219, open circles). After 5 hours at 45° C., the weight of each piece was compared to its initial weight. As shown below, under these conditions, 2P was the best solvent for J586-H, followed by 3EG, 1,2HD, and 4EG in that order. In both 2HE2I and glycerol solutions, J586-H showed virtually no dissolution.

Example 4

It has been observed that ink with 5% Joncryl 586 and no pigment gives rise to shiny, glossy fiber surfaces when printed with fixer. This is in contrast to ink with 5% polyurethane binder and no pigment, which does not give rise to glossy fiber surfaces. It appears that, under hot and dry conditions, Joncryl binder produces a glossy film on fiber surfaces. It has been suggested that, in the absence of water, Joncryl 586 dissolves in the non-volatile solvents from the ink remaining on the page. The residual organic solvents therefore help Joncryl deposits to flow and level, analogous to a "tail solvent" in coatings applications.

To probe the 'tail solvent' effect, inks were made with the following: solvent; Joncryl 586, which is a copolymer of acrylic acid and styrene; black pigment; surfactants Surfynol 485 and Zonyl FSO; and cosolvent LEG-1. ~2.7% 2P is included with the addition of Joncryl 586 into the ink, since 2P is used in Joncryl 586 to help dissolve the potassium salt of the copolymer.

Prints were made with the above-described ink using the drum test bed described in Example 1. HPMP and HMCC plain paper sheets, some with room-equilibrated moisture content and some dried with a heated gun, were fed into the printer. All prints were done with acidic fixer fluid printed under the black ink. The fixer components included Floquat FL-14 cationic polymer, 4-methylmorpholine-N-oxide (MMNO, used both as a buffer and a solvent), trimethylolpropane (EHPD) solvent, Surfynol 465 surfactant and Zonyl FSN surfactant. The test bed had ~2 mm wide vacuum lines on the surface, where the paper did not contact the drum. Thus, the local temperature of the paper was considerably cooler over such vacuum lines. When the ink described above was used to print the paper, the KOD was observed to be considerably higher in areas over vacuum lines. Thus the presence of vacuum lines in printed area fills was seen as a symptom of the KOD loss phenomenon, showing that KOD decreased in printed areas where heat was higher.

As shown below in Tables 4A and 4B which measures KOD in both area fill and vac lines in prints using various solvents, there is a strong correlation between solvents that dissolve acidified Joncryl and those that lead to vacuum lines when used as ink co-solvents. Specifically, the worst lines were seen with 2P, 1,2HD, 2HE2P and 3PG. In contrast, glycerol shows no vacuum lines, and 2HE2I and 4EG exhibit only minimal lines.

It can be seen there is a direct correlation between solvents that dissolve Joncryl 586-H as water evaporates and the formation of glossy (lower KOD) regions when printed under heated conditions. The dissolution of Joncryl 586 is known to be closely related to the formation of glossy regions on an ink/binder print obtained under heated conditions. Therefore both the dissolving of Joncryl 586-H and the formation of glossy regions are directly related to and indeed are just different manifestations of the same phenomenon of loss of optical density in ink/binder print printed under heated conditions. This phenomenon is, as shown above, very much affected by the solvent used in the ink.

TABLE 4A

| HPMP | No heat gun | | | Heat gun | | |
|---|---|---|---|---|---|---|
| | KOD area fill | KOD vac lines | Line intensity | KOD area fill | KOD vac lines | Line intensity |
| water | 1.44 | | none | 1.44 | 1.46 | faint |
| 2P | 1.44 | | none | 1.46 | 1.49 | moderate |
| 1,2HD | 1.20 | 1.21 | faint | 1.24 | 1.26 | moderate |
| glycerol | 1.49 | | none | 1.51 | | none |
| 2HE2I | 1.51 | | none | 1.51 | 1.51 | very faint |
| 2HE2P | 1.44 | 1.46 | faint | 1.36 | 1.40 | moderate |
| 4EG | 1.47 | | none | 1.46 | 1.45 | very faint |
| 3PG | 1.39 | 1.37 | faint | 1.31 | 1.33 | moderate |
| Ex 3 Ink | 1.40 | 1.41 | faint | 1.36 | 1.40 | moderate |

TABLE 4B

| HMCC | No heat gun | | | Heat gun | | |
|---|---|---|---|---|---|---|
| | KOD area fill | KOD vac lines | Line intensity | KOD area fill | KOD vac lines | Line intensity |
| water | 1.48 | | none | 1.47 | | none |
| 2P | 1.49 | | none | 1.48 | 1.50 | moderate |
| 1,2HD | 1.16 | 1.26 | moderate | 1.25 | 1.23 | moderate |
| glycerol | 1.51 | | none | 1.50 | | none |
| 2HE2I | 1.50 | | none | 1.50 | | none |
| 2HE2P | 1.47 | 1.5 | very faint | 1.45 | 1.46 | moderate |
| 4EG | 1.49 | 1.49 | very faint | 1.48 | 1.51 | faint |
| 3PG | 1.43 | 1.46 | moderate | 1.36 | 1.39 | moderate |
| Ex 3 Ink | 1.35 | 1.43 | moderate | 1.36 | 1.4 | moderate |

Example 5

Printed pigment inks were tested for optical density and alkaline highlighter durability on the surface of printed pigment ink images. The printed pigment ink images had an alkaline highlighter applied to their surfaces with a 2-pass highlighter smear procedure using a heated drum printer.

In Table 5 are set out the components of the pigment inks A, B, C and D. The components of the inks include pigment, surfactants, binders and solvents. The optical density (OD) and durability of the applied alkaline highlighter (Alka HL) were measured and the average of four papers printed with each one of the respective pigment inks was calculated and tabulated for Formulas A, B, C and D.

TABLE 5

| Formula | Pigment Cabo-jet 300 | Surfactants | | Binders | | Solvents | | | After 5-Mins 4 Paper Average | |
|---|---|---|---|---|---|---|---|---|---|---|
| | | Zonyl FSO | Triton X305 | Joncryl 586 | PU4 | 1,2Hex-anediol | 2P | 2HE2I | OD | AlkaHL |
| | 3.0 | 0.02 | 0 | 1.4 | 0.4 | 4.0 | 7.0 | 4.0 | 1.24 | 0.07 |
| | 3.0 | 0.02 | 0.3 | 1.4 | 0.4 | 0 | 4.0 | 7.0 | 1.31 | 0.07 |
| | 3.0 | 0.02 | 0.3 | 1.4 | 0.4 | 0 | 0 | 5.0 | 1.43 | 0.08 |
| | 3.0 | 0.02 | 0.3 | 1.4 | 0.4 | 0 | 0 | 5.0 | 1.43 | 0.08 |

What is claimed is:

1. A method of printing on a medium which reduces optical density loss in heated printed ink images compared to non-heated printed ink images, the heated printed ink images and the non-heated printed ink images each being produced using an ink having identical components printed on the medium via an identical printing process, the method comprising:
   applying an acidic fixer fluid to the medium;
   printing the ink on the medium with a printer to form ink images, the printer applying heat to the medium, and the ink comprising:
   a) colorant;
   b) a polymeric binder having an acid number (mg KOH neutralized by 1 g of the polymeric binder) below 200, the polymeric binder being selected from the group consisting of i) a combination of a styrene-acrylic polymeric binder and an anionic polyurethane binder, and ii) a combination of a styrene-acrylic polymeric binder, an acrylic polymeric binder, and an anionic polyurethane binder;
   c) water dispersible surfactant; and
   d) a solvent which does not dissolve an acidified form of the binder, the solvent having a vapor pressure less than 0.1 mm at 25° C., the solvent being selected from the group consisting of 1-(2-hydroxyethyl)-2-imidazolidinone, 2-hydroxyethyl-2-pyrrolidone, and combinations thereof; and
   immediately after printing, drying the ink images with forced heat applied to the medium to form the heated printed ink images.

2. The method of claim 1 wherein the colorant is selected from the group consisting of self-dispersed pigment, dispersible pigment, dye, and combinations thereof.

3. The method of claim 1 wherein the colorant is either black or color.

4. The method of claim 1 wherein the solvent has a vapor pressure less than $10^{-2}$ mm at 25° C.

5. The method of claim 1 wherein the styrene-acrylic polymeric binder comprises a copolymer comprised of acrylic acid and styrene.

6. The method of claim 1 wherein the acrylic polymeric binder comprises a copolymer comprised of acrylic acid and methacrylic acid.

7. The method of claim 1 wherein the anionic polyurethane binder comprises a copolymer comprised of diisocyanate, dimethylolpropionic acid and polypropylene glycol.

8. An inkjet ink, comprising:
   a) colorant;
   b) a polymeric binder having an acid number (mg KOH neutralized by 1 g of the polymeric binder) below 200, the polymeric binder being selected from the group consisting of i) a combination of a styrene-acrylic polymeric binder and an anionic polyurethane binder, and ii) a combination of a styrene-acrylic polymeric binder, an acrylic polymeric binder, and an anionic polyurethane binder;
   c) water dispersible surfactant; and
   d) a solvent which does not dissolve an acidified form of the styrene-acrylic polymeric binder or acrylic polymeric binder, the solvent having a vapor pressure less than 0.1 mm at 25° C., the solvent being selected from the group consisting of 1-(2-hydroxyethyl)-2-imidazolidinone, 2-hydroxyethyl-2-pyrrolidone, and combinations thereof;
   the ink being configured to exhibit a change in optical density, comparing non-heated printing on a medium to heated printing on the medium via an identical printing process, the optical density change ranging from 0.02 to about 0.10.

9. The inkjet ink of claim 8 wherein the colorant is selected from the group consisting of self-dispersed pigment, dispersible pigment, dye, and combinations thereof.

10. The inkjet ink of claim 8 wherein the colorant is either black or color.

11. The inkjet ink of claim 8 wherein the solvent has a vapor pressure less than $10^{-2}$ mm at 25° C.

12. The inkjet ink of claim 8 wherein the styrene-acrylic binder comprises a copolymer comprised of acrylic acid and styrene.

13. The inkjet ink of claim 8 wherein the acrylic polymeric binder comprises a copolymer comprised of acrylic acid and methacrylic acid.

14. The inkjet ink of claim 8 wherein the anionic polyurethane binder comprises a copolymer comprised of diisocyanate, dimethylolpropionic acid and polypropylene glycol.

15. A method of using an ink in combination with an acidic fixer fluid in a heated printing system, the system applying heat to a medium to prevent reduced optical density in heated printed ink images on the medium compared to non-heated printed ink images, the heated printed ink images and the non-heated printed ink images each being produced using the ink printed on the medium via an identical printing process, the method comprising:
   applying the acidic fixer fluid onto the medium to be printed with the ink;
   printing an ink image on the medium with a printer applying heat to the printed ink images, the ink including: a) colorant; b) a polymeric binder having an acid number (mg KOH neutralized by 1 g of the polymeric binder) below 200, the polymeric binder being selected from the group consisting of i) a combination of a styrene-acrylic polymeric binder and an anionic polyurethane binder, and ii) a combination of a styrene-acrylic polymeric binder, an acrylic polymeric binder, and an anionic polyurethane binder; c) water dispersible surfactant; and d) a solvent which does not dissolve an acidified form of the binder, the solvent having a vapor pressure less than 0.1 mm at 25° C., the solvent being selected from the group consisting of 1-(2-hydroxyethyl)-2-imidazolidinone, 2-hydroxyethyl-2-pyrrolidone, and combinations thereof; and immediately after printing, drying the ink images with forced heat applied to the medium to form the heated printed ink images.

16. The method of claim 15 wherein the colorant is selected from the group consisting of self-dispersed pigment, dispersible pigment, dye, and combinations thereof.

17. The method of claim 15 wherein the colorant is either black or color.

18. The method of claim 15 wherein the solvent has a vapor pressure less than $10^{-2}$ mm at 25° C.

19. The method of claim 15 wherein the styrene-acrylic polymeric binder comprises a copolymer comprised of acrylic acid and styrene.

20. The method of claim 15 wherein the acrylic polymeric binder comprises a copolymer comprised of acrylic acid and methacrylic acid.

21. The method of claim 15 wherein the anionic polyurethane binder comprises a copolymer comprised of diisocyanate, dimethylolpropionic acid and polypropylene glycol.

22. A printing system for heat-printing an ink onto a media in combination with an acidic fixer fluid, the printing system reducing optical density loss in heated printed images compared to non-heated printed images, the heated printed images and the non-heated printed images each being produced using the ink printed on the media via an identical printing process, the printing system comprising:

the ink, comprising: a) colorant; b) a polymeric binder having an acid number (mg KOH neutralized by 1 g of the polymeric binder) below 200, the polymeric binder being selected from the group consisting of i) a combination of a styrene-acrylic polymeric binder and an anionic polyurethane binder, and ii) a combination of a styrene-acrylic polymeric binder, an acrylic polymeric binder, and an anionic polyurethane binder; c) water dispersible surfactant; and d) a solvent which does not dissolve an acidified form of the binder, the solvent having a vapor pressure less than 0.1 mm at 25° C., the solvent being selected from the group consisting of 1-(2-hydroxyethyl)-2-imidazolidinone, 2-hydroxyethyl-2-pyrrolidone, and combinations thereof;

the acidic fixer fluid;

a medium for receiving the printed images;

and a heated printer for printing the printed images and applying forced heat to the medium on which the printed images are printed.

23. The printing system of claim 22 wherein the colorant is selected from the group consisting of self-dispersed pigment, dispersible pigment, dye, and combinations thereof.

24. The printing system of claim 22 wherein the colorant is either black or colored.

25. The printing system of claim 22 wherein the solvent has a vapor pressure less than $10^{-2}$ mm at 25° C.

26. The printing system of claim 22 wherein the styrene-acrylic polymeric binder comprises a copolymer comprised of acrylic acid and styrene.

27. The printing system of claim 22 wherein the acrylic polymeric binder comprises a copolymer comprised of acrylic acid and methacrylic acid.

28. The printing system of claim 22 wherein the anionic polyurethane binder comprises a copolymer comprised of diisocyanate, dimethylolpropionic acid and polypropylene glycol.

29. An inkjet printer fluid set, comprising a black ink, at least one non-black ink, and an acidic fixer fluid, wherein the black ink comprises:

a) black colorant;
b) a polymeric binder having an acid number (mg KOH neutralized by 1 g of the polymeric binder) below 200, the polymeric binder being selected from the group consisting of i) a combination of a styrene-acrylic polymeric binder and an anionic polyurethane binder, and ii) a combination of a styrene-acrylic polymeric binder, an acrylic polymeric binder, and an anionic polyurethane binder;
c) water dispersible surfactant; and
d) a solvent which does not dissolve an acidified form of the binder, the solvent having a vapor pressure less than 0.1 mm at 25° C., the solvent being selected from the group consisting of 1-(2-hydroxyethyl)-2-imidazolidinone, 2-hydroxyethyl-2-pyrrolidone, and combinations thereof;

the black ink being configured to exhibit a change in optical density, comparing non-heated printing on a medium to heated printing on the medium via an identical printing process, the optical density change ranging from 0.02 to about 0.10.

30. The inkjet printer fluid set of claim 29 wherein the colorant is selected from the group consisting of self-dispersed pigment, dispersible pigment, dye, and combinations thereof.

31. The inkjet printer fluid set of claim 29 wherein the colorant for the black ink is a black colorant, and the colorant for the at least one non-black ink is a colored colorant.

32. The inkjet printer fluid set of claim 29 wherein the solvent has a vapor pressure less than $10^{-2}$ mm at 25° C.

33. The inkjet printer fluid set of claim 29 wherein the styrene-acrylic polymeric binder comprises a copolymer comprised of acrylic acid and styrene.

34. The inkjet printer fluid set of claim 29 wherein the acrylic polymeric binder comprises a copolymer comprised of acrylic acid and methacrylic acid.

35. The inkjet printer fluid set of claim 29 wherein the anionic polyurethane binder comprises a copolymer comprised of diisocyanate, dimethylolpropionic acid and polypropylene glycol.

36. The method of claim 1 wherein the optical density loss, comparing non-heated printing to heated printing, ranges from 0.02 to about 0.10.

37. The printing system of claim 22 wherein the optical density loss, comparing non-heated printing to heated printing, ranges from 0.02 to about 0.10.

38. The method of claim 1 wherein the printer applies heat to the medium at a temperature of about 40° C.

39. The method as defined in claim 1 wherein the solvent is not selected from 1,2-hexanediol or 2-pyrrolidone.

* * * * *